US012420526B2

(12) United States Patent
Kaida et al.

(10) Patent No.: US 12,420,526 B2
(45) Date of Patent: Sep. 23, 2025

(54) DECORATIVE MATERIAL, LAMINATE, AND METHOD FOR MANUFACTURING DECORATIVE MATERIAL

(71) Applicant: DAI NIPPON PRINTING CO., LTD., Tokyo (JP)

(72) Inventors: Takafumi Kaida, Sagamihara (JP); Yuji Tanaka, Atsugi (JP); Yuki Aoyama, Odawara (JP); Ryouichi Satou, Aiko-gun (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

(21) Appl. No.: 18/584,606

(22) Filed: Feb. 22, 2024

(65) Prior Publication Data

US 2024/0190107 A1 Jun. 13, 2024

Related U.S. Application Data

(63) Continuation of application No. 17/800,186, filed as application No. PCT/JP2021/006282 on Feb. 19, 2021, now Pat. No. 11,931,987.

(30) Foreign Application Priority Data

Feb. 21, 2020 (JP) ................................. 2020-028598

(51) Int. Cl.
*B32B 3/10* (2006.01)
*B32B 3/30* (2006.01)

(Continued)

(52) U.S. Cl.
CPC ................ *B32B 15/08* (2013.01); *B32B 3/30* (2013.01); *B32B 7/12* (2013.01); *B32B 2255/10* (2013.01);

(Continued)

(58) Field of Classification Search
None
See application file for complete search history.

(56) References Cited

U.S. PATENT DOCUMENTS

2002/0187314 A1 12/2002 Shibata
2015/0353777 A1 12/2015 Callinan et al.

FOREIGN PATENT DOCUMENTS

JP S59-118556 U 8/1984
JP H04-350654 A 12/1992

(Continued)

OTHER PUBLICATIONS

Machine translation of JP-2017165077-A (Year: 2017).*

(Continued)

*Primary Examiner* — Christopher M Polley
(74) *Attorney, Agent, or Firm* — Oliff PLC

(57) ABSTRACT

A decorative material having a design with an excellent tactile and a visual effect. The decorative material has a texture region on a base material, the texture region is composed of: a plurality of projection regions containing a plurality of particles with a particle size of 5 μm or more and 60 μm or less and independent of each other; and a gap region between the projection regions, and the average diameter of the circumscribed circles of the projection regions, when the texture region is viewed in plan view, is 100 μm or more and 500 μm or less.

18 Claims, 6 Drawing Sheets

(51) Int. Cl.
  *B32B 7/12*   (2006.01)
  *B32B 15/08*  (2006.01)

(52) U.S. Cl.
  CPC ... *B32B 2260/046* (2013.01); *B32B 2264/303* (2020.08); *B32B 2264/50* (2020.08); *B32B 2307/4026* (2013.01); *B32B 2451/00* (2013.01)

(56) References Cited

FOREIGN PATENT DOCUMENTS

| | | |
|---|---|---|
| JP | H06-320699 A | 11/1994 |
| JP | H08-141495 A | 6/1996 |
| JP | 2002-347399 A | 12/2002 |
| JP | 2006-123373 A | 5/2006 |
| JP | 2007-276346 A | 10/2007 |
| JP | 3997802 B2 * | 10/2007 |
| JP | 2011-164180 A | 8/2011 |
| JP | 2015-193209 A | 11/2015 |
| JP | 2015-208875 A | 11/2015 |
| JP | 2016-503737 A | 2/2016 |
| JP | 2016-215423 A | 12/2016 |
| JP | 2017-087544 A | 5/2017 |
| JP | 2017-159544 A | 9/2017 |
| JP | 2017165077 A * | 9/2017 |
| JP | 6317613 B2 | 4/2018 |
| JP | 2019-099649 A | 6/2019 |
| WO | 2016/190262 A1 | 12/2016 |

OTHER PUBLICATIONS

Machine translation of JP-3997802-B2 (Year: 2007).*
Apr. 27, 2021 International Search Report issued in International Patent Application No. PCT/JP2021/006282.
Dec. 27, 2023 Written Opinion issued in Singapore Patent Application No. 11202252079Y.

* cited by examiner

[Fig. 1]
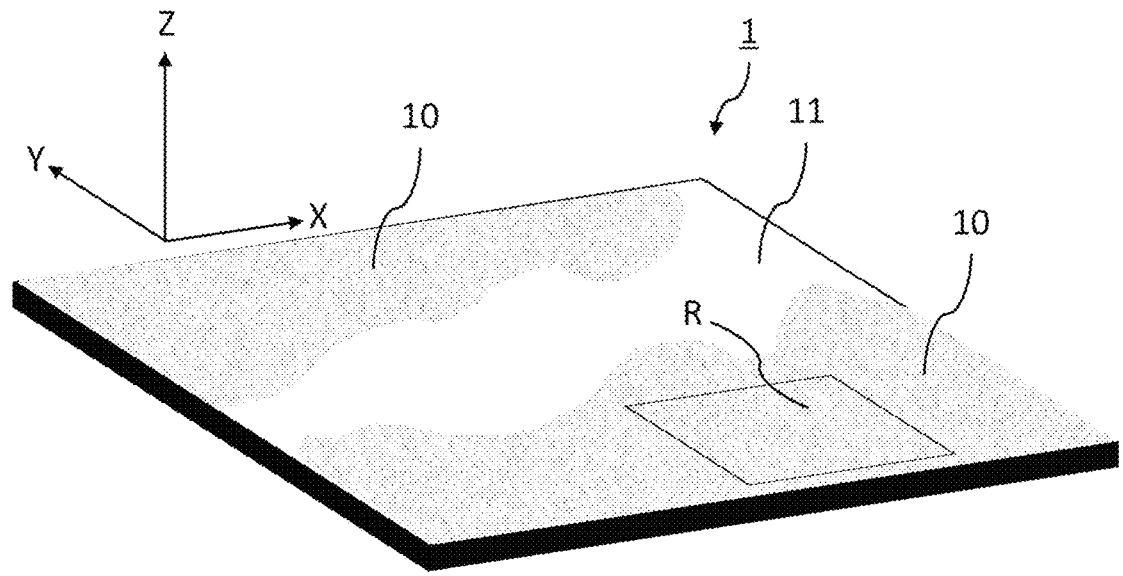
[Fig. 2]
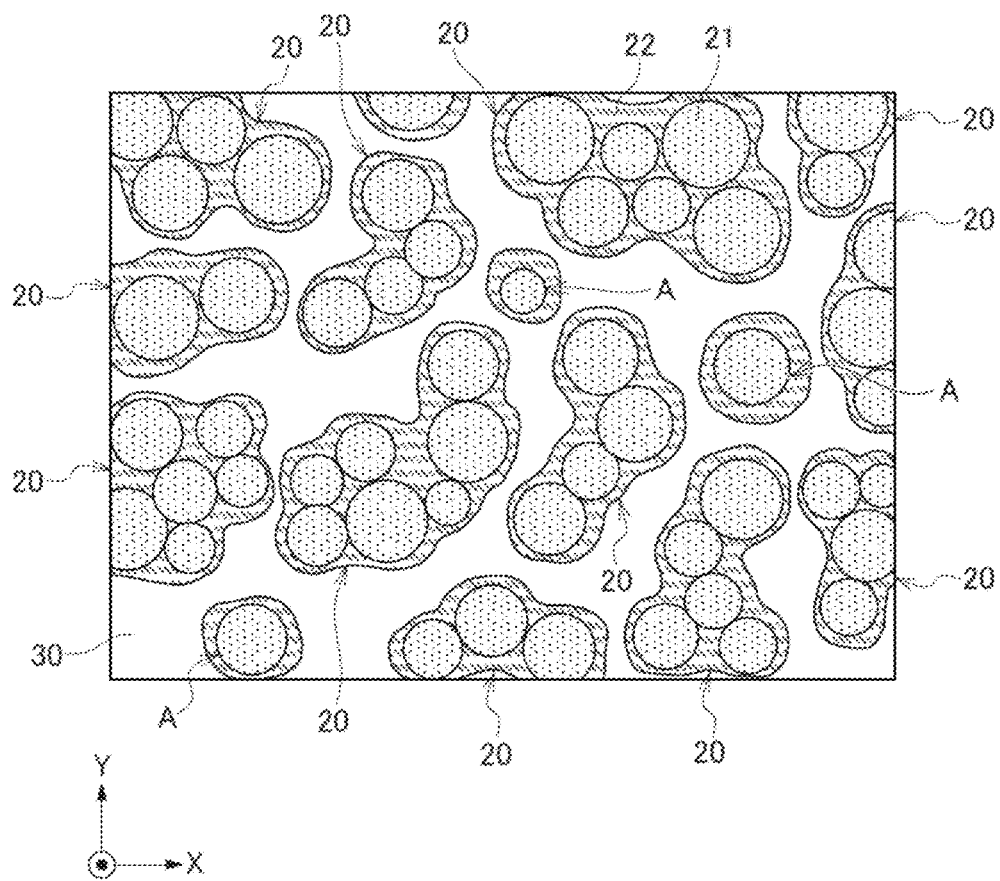

[Fig. 3]
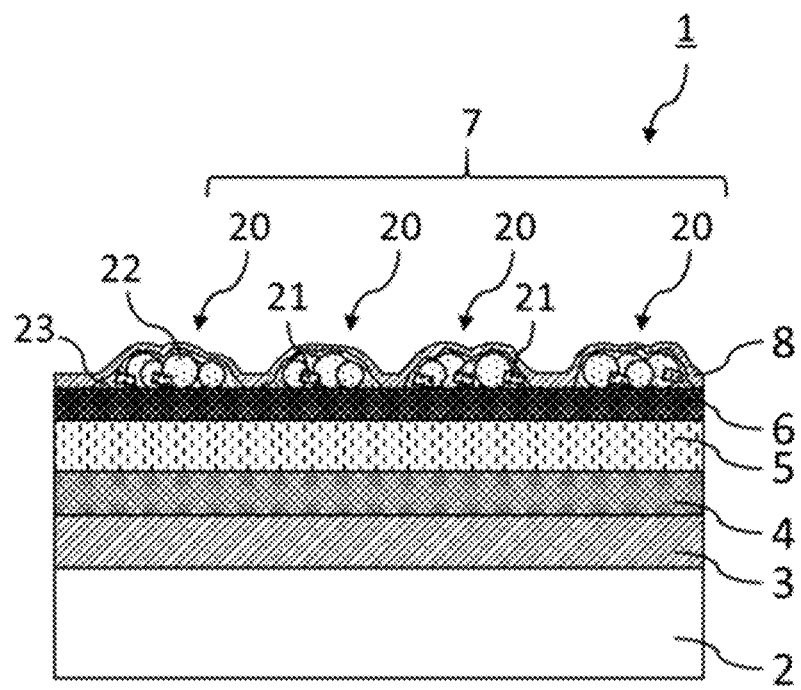

[Fig. 4]
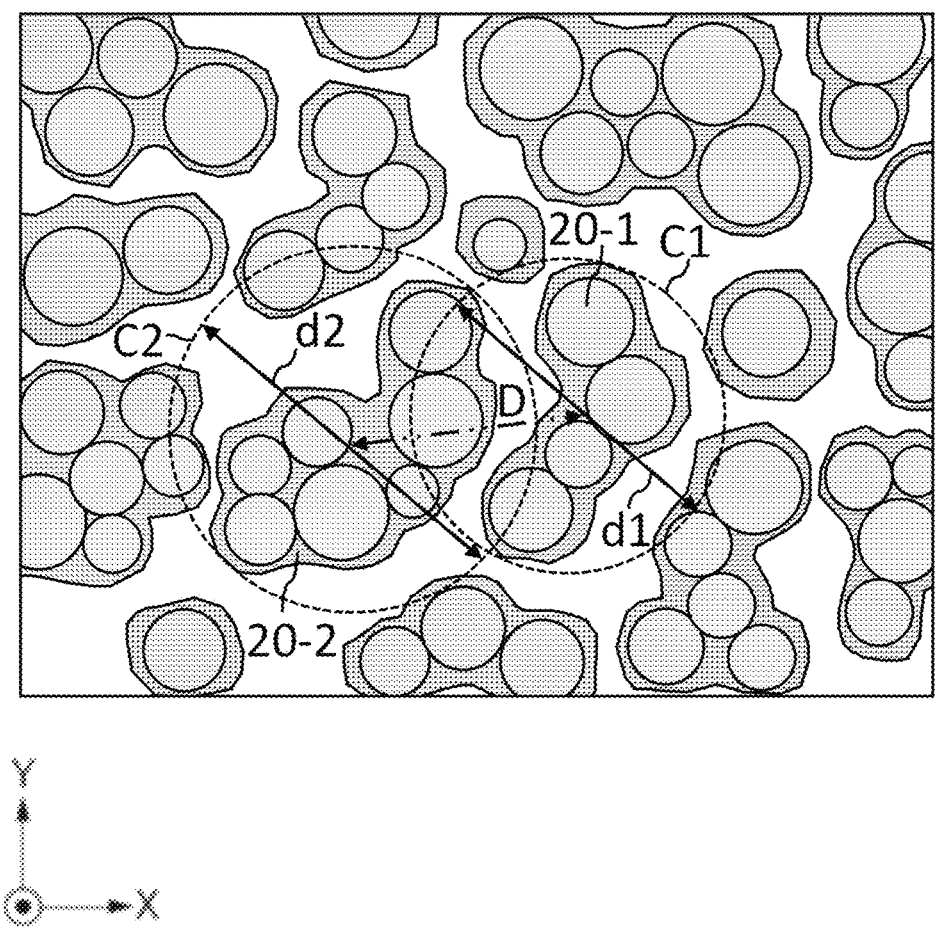

[Fig. 5]
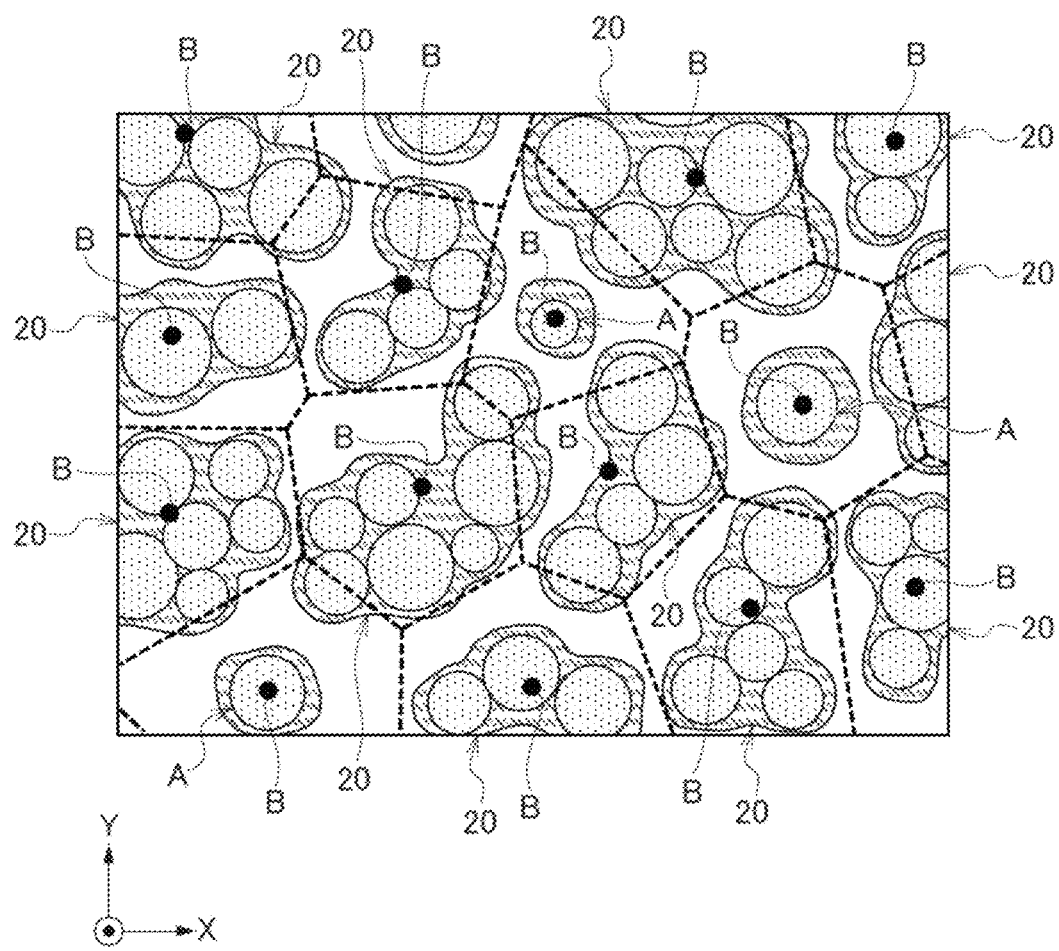

[Fig. 6]
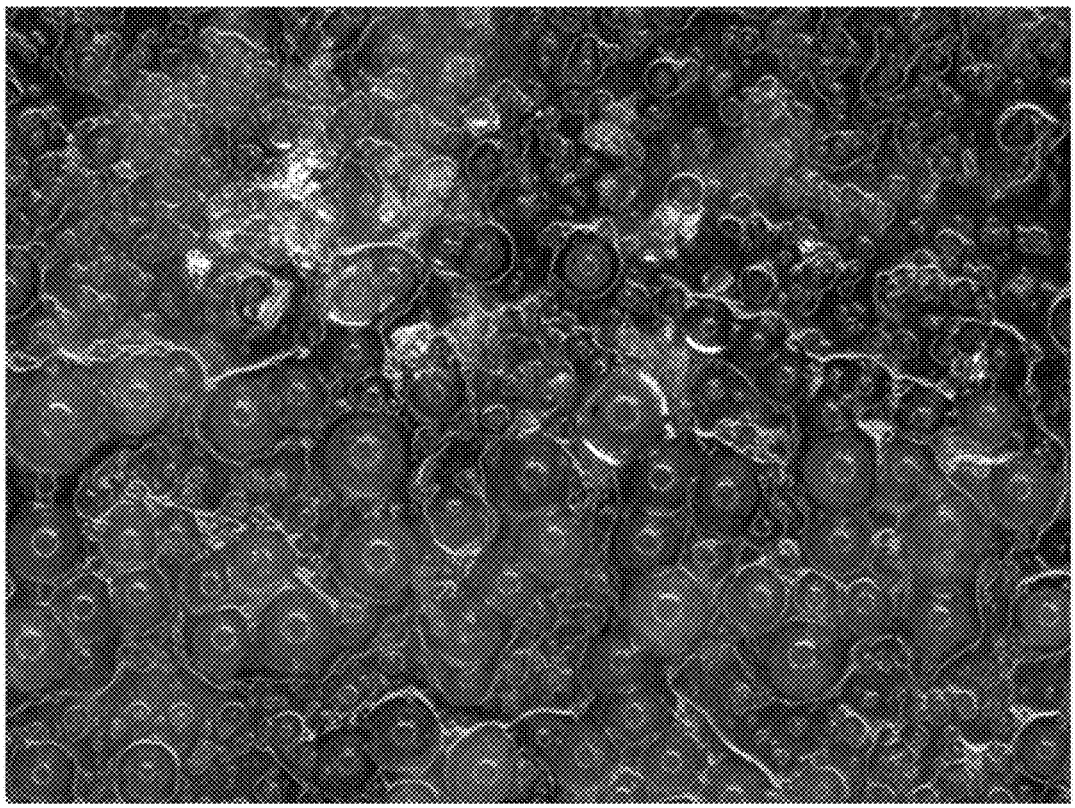
[Fig. 7]
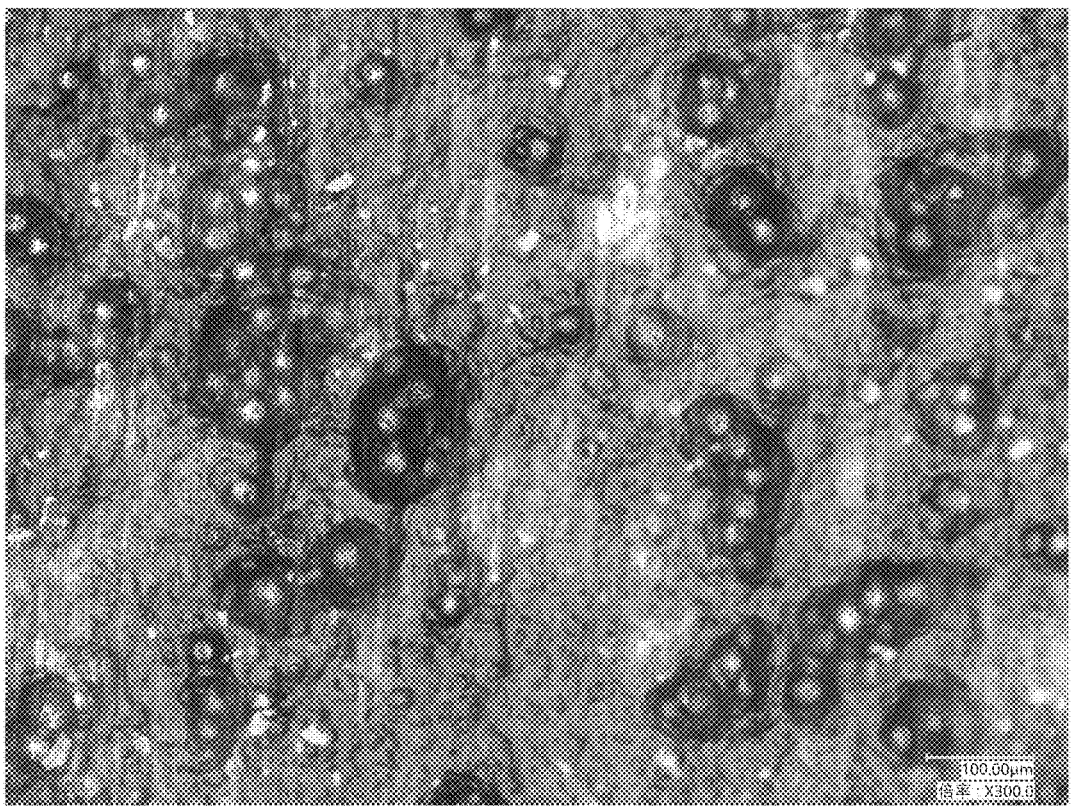

[Fig. 8]
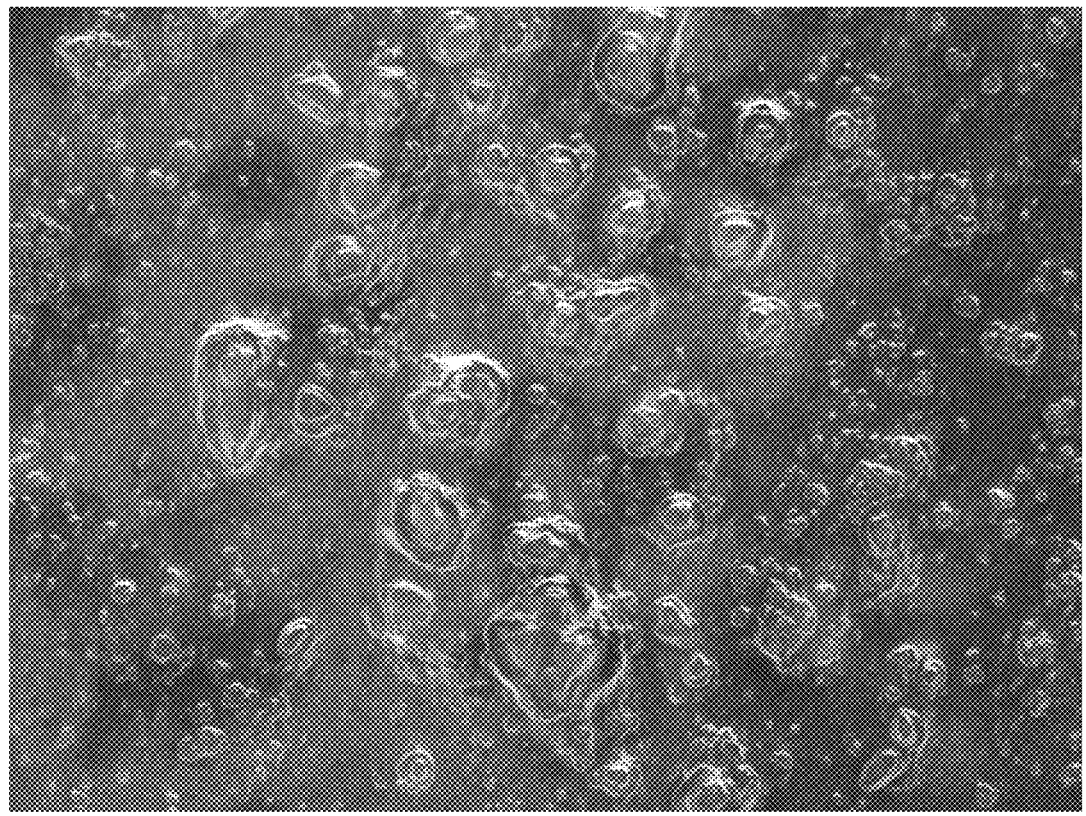
[Fig. 9]
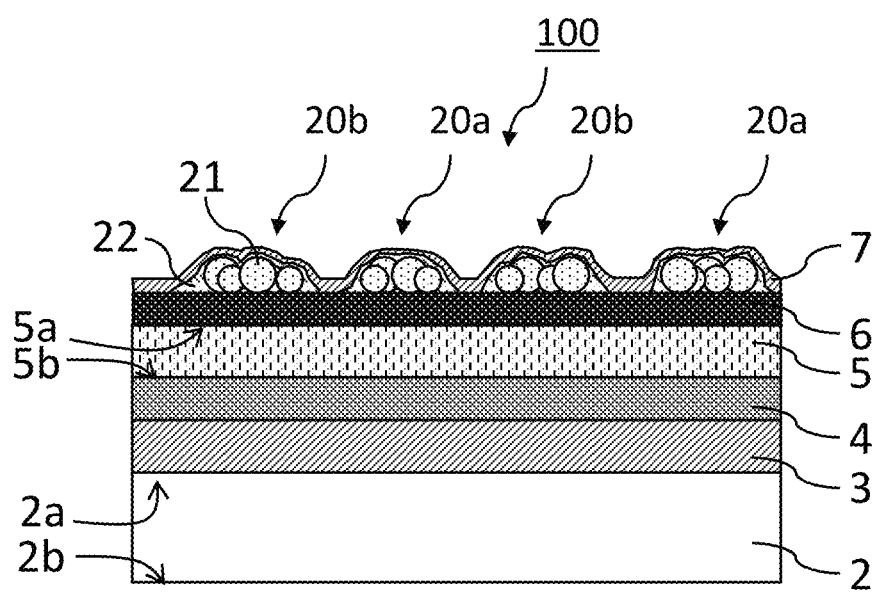

DECORATIVE MATERIAL, LAMINATE, AND METHOD FOR MANUFACTURING DECORATIVE MATERIAL

CROSS-REFERENCE TO RELATED APPLICATIONS

This is a Continuation of application Ser. No. 17/800,186 filed Aug. 16, 2022, which in turn is a national stage entry of PCT/JP2021/006282 filed Feb. 19, 2021, which claims priority to JP 2020-028598 filed Feb. 21, 2020. The disclosure of the prior applications is hereby incorporated by reference herein in its entirety.

TECHNICAL FIELD

The present disclosure relates to a decorative material, a laminate, and a method for manufacturing a decorative material.

BACKGROUND ART

Decorative materials are widely used for surface decoration such as building interiors, construction materials, furniture, fittings, building materials, vehicles, home appliances, bathroom products including modular baths, and kitchen products. Such a decorative material includes an adherend base material to which paper or a resin sheet printed with a picture pattern is attached, and a metal plate such as a steel plate with a picture pattern formed by printing on its surface.

In such a decorative material, a texture (tactile) synchronized with the picture pattern and a luxury design may be imparted by further giving an irregular pattern onto the surface.

As a decorative material having an irregular shape on the surface, an embossed decorative material using an embossed plate in which an irregular shape is formed has been proposed (for example, PTLs 1 and 2). Further, a decorative material in which an irregular pattern is imparted onto the surface of the base material by overlay printing has been proposed (for example, PTL 3).

PTL 4 discloses a decorative steel plate with enhanced design by partially providing a pattern layer consisting of a resin material containing resin beads on a steel plate base material.

PTL 5 discloses a decorative material provided with a pattern printing layer consisting of a resin containing particles on a base material. An irregular pattern is formed by projections that are regions provided with a pattern printing layer and recesses provided with no pattern printing layer to impart an excellent tactile to a surface of the decorative material of PTL 5.

CITATION LIST

Patent Literature

PTL 1: JP 2015-193209 A
PTL 2: JP 2017-87544 A
PTL 3: JP 63-17613 B
PTL 4: JP 2006-123373 A
PTL 5: JP 2016-215423 A

SUMMARY OF INVENTION

Technical Problem

However, as described in PTLs 1 and 2, in the case of imparting a design of an irregular pattern by embossing, an embossed plate is required for each pattern, and therefore there has been a problem that it is costly and difficult to manufacture. Further, the irregular pattern is large, and it has been difficult to obtain a tactile synchronized with the picture pattern of the base. Further, it is difficult to synchronize the irregular shape with the pattern of the base in embossing, and there has been a problem that it is difficult to impart a high level of design.

In the overlay printing described in PTL 3, the thickness of the printing pattern is almost uniform, and therefore only a monotonous tactile has been obtained. Further, in the technique of PTL 3, only a visually monotonous pattern can be formed, and it has been difficult to obtain a luxury decorative material.

Although the decorative materials described in PTLs 4 and 5 have a better tactile than those by embossing and overlay printing, a further improvement in tactile has been desired.

In view of the aforementioned problems, it is an object of the present disclosure to provide a decorative material having a design with an excellent tactile and a visual effect.

Solution to Problem

In order to solve the aforementioned problems, the present disclosure provides [1] to [18] below.

[1] A decorative material comprising a texture region on a base material, wherein the texture region is composed of: a plurality of projection regions that comprise a plurality of particles with a particle size of 5 µm or more and 60 µm or less and are independent of each other; and a gap region between the projection regions, and the average diameter of the circumscribed circles of the projection regions, when the texture region is viewed in plan view, is 100 µm or more and 500 µm or less.

[2] The decorative material according to [1], wherein the area percentage of the projection regions in the range of 1 cm square of the texture region is 20% or more and 70% or less.

[3] The decorative material according to [1] or [2], wherein when the average diameter of the circumscribed circles of a set of adjacent projection regions is referred to as $d_{ave}$, and the distance between the centers of the set of adjacent circumscribed circles is referred to as D, 90% or more of all the combinations satisfy $0.5 \leq D/d_{ave} \leq 6.0$.

[4] The decorative material according to any one of [1] to [3], wherein the shortest distance between the adjacent projection regions is 50 µm or more and 120 µm or less.

[5] The decorative material according to any one of [1] to [4], wherein the average height of the projection regions is 10 µm or more and 60 µm or less.

[6] The decorative material according to any one of [1] to [5], wherein the projection regions have an irregular shape.

[7] The decorative material according to any one of [1] to [6], comprising a heaping layer at least partially on the base material and the texture region on a surface of the decorative material on the side having the heaping layer.

[8] The decorative material according to any one of [1] to [7], wherein the area percentage of the texture region in the surface of the decorative material is 10% or more and 90% or less.

[9] The decorative material according to any one of [1] to [8], wherein the area percentage of the gap region in the range of 1 cm square of the texture region is 30% or more and 80% or less.

[10] The decorative material according to any one of [1] to [9], wherein the base material is a metal base material.

[11] The decorative material according to any one of [1] to [10], comprising a surface coating layer on the outermost surface of the decorative material on the side having the texture region.

[12] The decorative material according to any one of [1] to [11], wherein the projection regions further comprise bright particles.

[13] A decorative material comprising:

a metal base material made of metal having a first surface and a second surface;

a pattern layer having a first surface and a second surface and comprising a resin binder and colorants, the second surface side of the pattern layer being disposed facing the first surface side of the metal base material; and a particle group comprising particles with a particle size of 5 μm or more and 60 μm or less and disposed on the first surface side of the pattern layer, wherein the surface of the decorative material comprises a texture region having a texture and a tactile different from those of the second surface of the metal base material, the texture region has irregularities, the irregularities comprise a first projection region, a second projection region present at a position away from the first projection region, and a gap region present between the first projection region and the second projection region, and the first projection region and the second projection region project on the front side of the decorative material due to the presence of the particle group.

[14] A laminate comprising an adherend and the decorative material according to any one of [1] to [13] that is laminated on the adherend.

[15] A method for manufacturing decorative material, the method comprising a step of forming a texture region on a base material, wherein the texture region is composed of projection regions independent of each other and a gap region between the projection regions, each of the projection regions comprises a plurality of particles with a particle size of 5 μm or more and 60 μm or less, and the average diameter of the circumscribed circles of the projection regions, when the texture region is viewed in plan view, is 100 μm or more and 500 μm or less.

[16] The method for manufacturing decorative material, according to [15], wherein the texture region is formed by applying an ink for heaping layers onto the base material and drying it.

[17] The method for manufacturing decorative material, according to [15], wherein the texture region is formed by transferring a transfer layer of a transfer sheet having the transfer layer on a release layer to the base material.

[18] The method for manufacturing decorative material according to any one of [15] to [17], wherein the base material is a metal base material.

Advantageous Effect of Invention

According to the present disclosure, a decorative material having a design with an excellent tactile and a visual effect can be obtained.

BRIEF DESCRIPTION OF DRAWINGS

FIG. 1 is a perspective view of a decorative material according to one specific example of the present embodiment.

FIG. 2 is a schematic plan view enlarging the region represented by reference numeral R in FIG. 1.

FIG. 3 is a schematic cross-sectional view of parts provided with a texture region in a decorative material according to one specific example of the present embodiment.

FIG. 4 is a view for explaining each definition of "circumscribed circles in projection regions", "diameters of circumscribed circles", and "distance between centers of a set of adjacent circumscribed circles" in the present embodiment.

FIG. 5 is a view for explaining the definition of "adjacent projection regions" in the present embodiment.

FIG. 6 is a micrograph of a texture region in the decorative material of Example 1.

FIG. 7 is a micrograph of a texture region in the decorative material of Example 4.

FIG. 8 is a micrograph of a texture region in the decorative material of Comparative Example 1.

FIG. 9 is a schematic cross-sectional view of parts provided with a texture region in a decorative material according to another specific example of the present embodiment.

DESCRIPTION OF EMBODIMENTS

[Decorative Material]

The decorative material of the present embodiment comprises a texture region on a base material, wherein the texture region is composed of: a plurality of projection regions that comprise a plurality of particles with a particle size of 5 μm or more and 60 μm or less and are independent of each other; and a gap region between the projection regions, and the average diameter of the circumscribed circles of the projection regions, when the texture region is viewed in plan view, 100 μm or more and 500 μm or less.

FIG. 1 is a perspective view of a decorative material according to one specific example of the present embodiment. A decorative material 1 has a visible picture pattern when viewed from the front side. Further, the decorative material 1 has a visible texture region 10 on a base material on the front side. The texture region 10 is not necessarily provided on the entire surface of the decorative material 1 and may be partially provided. In the case where the texture region 10 is partially provided, a region other than the texture region will be referred to as the "other region 11" in the present embodiment. The texture region 10 can be distinguished from the other region, for example, by the area percentage of the projection regions, which will be described below.

The texture region 10 is preferably provided in a pattern synchronized at least partially with the picture pattern. Thereby, a three-dimensional tactile corresponding to the picture pattern can be obtained.

The area percentage of the texture region on the surface of the decorative material is not particularly limited. In order to impart a contrast between the texture region and the other region, the area percentage of the texture region on the surface of the decorative material is preferably 10% or more and 90% or less, more preferably 20% or more and 80% or less, more preferably 30% or more and 70% or less.

The decorative material comprises a heaping layer at least partially on the base material and may comprise a texture region on a surface of the decorative material on the side having the heaping layer (FIG. 3).

In the present embodiment, the "plan view" means that the decorative material of the present embodiment is visually recognized in the plane direction from the surface side (front side) on which the texture region is provided. For example, in the XYZ coordinate system shown in FIG. 1, the planes represented by the X-axis direction and the Y-axis direction substantially coincide with the surface of the base material, and the "plan view" corresponds to viewing the surface of the base material from the Z-axis direction.

[Texture Region]

FIG. 2 is a schematic plan view enlarging the region represented by reference numeral R in FIG. 1. FIG. 2 is a view in which the texture region is observed from the Z-axis direction of the XYZ coordinate system. The surface as shown in FIG. 2 can be observed by using a microscope such as an optical microscope and a scanning electron microscope. That is, FIG. 2 shows a fine structure of the texture region.

The texture region can impart a tactile onto the surface of the decorative material.

As shown in FIG. 2, a plurality of projection regions 20 independent of each other by a gap gather together in the decorative material of the present embodiment. Each projection region 20 is a so-called "island region (island part)" having a closed curve contour in plan view. FIG. 2 shows gathering of the irregular projection regions 20 having a closed curve contour with a protruding part and a recessed part in plan view. The region between the plurality of projection regions 20 will be referred to as a gap region 30 in the present embodiment. The gap region 30 is a so-called "sea part" to which the later-described protective layer or pattern layer is exposed. The presence of the sea part between the island parts allows the projection regions 20 to be present independent of each other. The structure having the island parts and the sea part in FIG. 2 is also called a sea-island structure. Further, in the structure of FIG. 2, the "sea-island structure" can be referred to also as "phase-separated structure", the "island part" can be referred to also as "isolated phase", and the "sea part" can be referred to also as "continuous phase".

Each "projection region" mentioned above is defined as a region having a height of 10 or more when the height is measured in the entire texture region, the maximum height is taken as 100, and the minimum height is taken as 0. Further, the "gap region" mentioned above is defined as a region having such a height of less than 10.

The projection region 20 may have an irregular or regular shape. The projection region 20 preferably has an irregular shape for enhancing a texture as a natural object.

The "irregular projection regions" can be expressed also as a shape having any of the following characteristics.

(1) The case where the shapes of the plurality of projection regions are not all congruent when viewed in plan view, and two or more projection regions have different shapes and sizes. All of the projection regions in the texture region may have different shapes and sizes and may include two or more congruent or similar projection regions.

(2) The case where the shapes of the plurality of projection regions are different from relatively monotonous shapes such as regular polygons, circles, ellipses, and cardioids (heart shapes) when viewed in plan view. For example, complex shapes in which the contours of the projection regions need to be approximated by a combination of complex functions such as polynomials and infinite series.

(3) The case where the shapes have the characteristics of both (1) and (2).

In the present embodiment, the "regular" shape refers to a relatively monotonous shape such as regular polygons, circles, ellipses, cardioids (heart shapes) when viewed in plan view. The "regular projection regions" mean that all of the plurality of projection regions have a congruent shape when viewed in plan view.

Each of the projection regions 20 comprises a plurality of particles 21 with a particle size of 5 μm or more and 60 μm or less therein, and the particles 21 are present in the projection region 20 while aggregating in the plane and further aggregating also in the thickness direction. When the projection regions 20 are viewed in plan view, a region in which two or more particles with a particle size of 5 μm or more and 60 μm or less do not aggregate can be present, as represented by reference numeral A in FIG. 2 (for example, only one particle is present in a continuous island part of a resin). Such a region is not referred to as the "projection region" in the present embodiment but is allowed to exist within a range that does not impair the effects to be exerted by the present embodiment and the solution of the problems.

FIG. 3 is a schematic cross-sectional view of the part where the texture region is provided in the decorative material according to one specific example of the present embodiment. That is, FIG. 3 is a schematic cross-sectional view when the texture region of the decorative material shown as an example in FIG. 1 is cut in the Z-axis direction. In the texture region of the decorative material 1 of the present embodiment, a primer layer 3, a base coating layer 4, a pattern layer 5, a protective layer 6, a heaping layer 7, and a surface coating layer 8 are provided on a base material 2 in this order. The heaping layer 7 forms a texture region on a surface of the decorative material on the side having the heaping layer. The other region is preferably provided with substantially no heaping layer.

As schematically shown in FIG. 3, the particles of the projection regions 20 are present on the protective layer 6 (or the pattern layer 5), and the particles 21 are coated with a binder resin 22 in the decorative material 1 of the present embodiment. In the present embodiment, since the coating with the resin is thin, the surface of the projection regions 20 has an irregular shape roughly following the surface shape of the particles. That is, the texture region includes irregularities (relatively large irregularities) derived from a plurality of projection regions 20 provided in a pattern and irregularities (relatively small irregularities) derived from the particles 21 on the surface of each projection region 20. The combination of these two irregularities allows an excellent tactile to be obtained. Further, the texture region has a gap region between the projection regions 20 in FIG. 3. Such a gap region and the aforementioned large irregularities cause a contrast between a weak tactile and a strong tactile to allow an excellent tactile to be obtained. As compared with the case where only the projection region is provided in the entire texture region as in PTLs 4 and 5 above, the decorative material of the present embodiment allows a more excellent tactile to be obtained.

Further, in the case where the decorative material has another region, a difference in gloss can be generated between the texture region where the projection regions are present and the other region where no projection regions are provided. Further, a difference in gloss is generated in microregions between each projection region and the gap region even within the texture region. As a result, even as compared with PTLs 4 and 5 above, a more excellent visual effect (so-called gloss/matte effect) can be obtained.

In view of obtaining an excellent tactile, the average height of the projection regions 20 is preferably 10 μm or more and 60 μm or less, more preferably 15 μm or more and 45 μm or less, further preferably 20 μm or more and 35 μm or less.

Since the projection regions 20 have irregular or regular shapes, the diameters of the circumscribed circles as viewed in plan view (when viewed from the surface) respectively indicate the sizes of the projection regions 20. FIG. 4 is a schematic plane enlarged view of the texture region and shows the same as FIG. 2. The circumscribed circle of the projection region 20-1 is a circle represented by reference numeral C1. The diameter of the circumscribed circle C1 is shown by an arrow represented by reference numeral d1. Likewise, the circumscribed circle of the projection region 20-2 is a circle represented by reference numeral C2. The diameter of the circumscribed circle C2 is shown by an arrow represented by reference numeral d2. The average diameter of the circumscribed circles of the projection regions 20 in the entire texture region is defined as "average diameter d".

In the present embodiment, the average diameter d of the circumscribed circles of the projection regions 20 is 100 μm or more and 500 μm or less. When the average diameter d is less than 100 μm, a sufficient tactile cannot be obtained. Further, when the average diameter d is more than 500 μm, the tactile deteriorates, and the projection regions can be visually recognized, so that a luxury design cannot be obtained. The average diameter d is preferably 150 μm or more and 350 μm or less, more preferably 200 μm or more and 250 μm or less.

When the projection regions 20 are spaced apart from each other, a sufficient tactile may not be obtained in some cases. That is, the projection regions 20 are preferably closely arranged to some extent in the texture region.

In view of the tactile, the area percentage of the projection regions 20 in the texture region of the decorative material of the present embodiment is preferably 20% or more and 70% or less in the range of 1 cm square. The range of 1 cm square is defined in consideration of the contact area of a finger when the decorative material is touched. The area percentage is more preferably 25% or more and 60% or less, further preferably 30% or more and 50% or less. The remainder in the texture region other than the projection regions 20 is the gap region. The area percentage of the gap region in the range of 1 cm square of the texture region is preferably 30% or more and 80% or less, more preferably 40% or more and 75% or less, further preferably 50% or more and 70% or less.

The decorative material of the present embodiment may have another region (region other than the texture region). The other region preferably has a tactile and a gloss different from those of the texture region.

In order to distinguish the tactile between the texture region and the other region, the area percentage of the projection regions in the range of 1 cm square of the other region is preferably less than 20% of region, more preferably 10% or less, more preferably 5% or less, more preferably 3% or less, more preferably 1% or less, more preferably 0%.

The area percentage of the projection regions is a value obtained by image analysis of an optical micrograph (magnification: 300 times) and is an average obtained by measuring 10 points in the texture region and the other region.

Further, in order to distinguish the tactile between the texture region and the other region, the other region is preferably substantially free from particles with a particle size of 5 μm or more. When the other region is viewed in plan view, the percentage of the area where the particles with a particle size of 5 μm or more are present is preferably 3% or less, more preferably 1% or less, more preferably 0.3% or less, more preferably 0%.

Further, when 60-degree specular gloss of the texture region is defined as G60A, and the 60-degree specular gloss of the other region is defined as G60B, the ratio G60A/G60B is preferably 0.8 or less, more preferably 0.6 or less, more preferably 0.5 or less. Setting the ratio G60A/G60B to such a value can facilitate distinguishing the gloss between the texture region and the other region. The 60-degree specular glosses G60A and G60B are each an average of the measured values at 10 points.

In view of the tactile, when the average diameter of the circumscribed circles of a set of adjacent projection regions 20 when the entire texture region 10 is viewed in plan view is referred to as $d_{ave}$, and the distance between the centers of the set of adjacent circumscribed circles is referred to as D, 90% or more of all the combinations preferably satisfy $0.5 \leq D/d_{ave} \leq 6.0$, in the decorative material of the present embodiment.

The $d_{ave}$ and D described above will be described with reference to FIG. 4. The diameters of the circumscribed circles of one set of adjacent projection regions 20-1 and 20-2 are respectively referred to as d1 and d2. Accordingly, $d_{ave}=(d1+d2)/2$ is satisfied. Further, the distance between the center D is the distance between the arrows of the two-dot broken line.

A large $D/d_{ave}$ indicates that the distance between the adjacent projection regions is large, and the projection regions are sparsely distributed. The upper limit of $D/d_{ave}$ is preferably 5.5, more preferably 5.0, further preferably 4.5. Meanwhile, a smaller $D/d_{ave}$ indicates that the projection regions are more closely arranged. Meanwhile, in the case where $D/d_{ave}<1$ is satisfied, the region where parts of adjacent projection regions overlap each other when viewed in plan view increases depending on the shape of the projection regions. In particular, the fact that $D/d_{ave}$ is 0 means that the projection regions geometrically overlap each other to form one region. In order for the two projection regions to be independent of each other by the gap, the lower limit of $D/d_{ave}$ is preferably 0.5, as described above.

The set of adjacent projection regions satisfying $D/d_{ave}$ falling within such a range more preferably accounts for 95% or more of all the combinations.

Further, the shortest distance between the adjacent projection regions is preferably 50 μm or more and 120 μm or less, more preferably 60 μm or more and 110 μm or less, further preferably 70 μm or more and 100 μm or less. The shortest distance falling within such a range means that the projection regions are closely arranged in the texture region, so that a good tactile can be obtained.

Here, the "adjacent projection regions" are defined as follows. FIG. 5 shows the results of determining the centers B of the circumscribed circles of the projection regions 20 and island parts A that are not regarded as projection regions in the schematic enlarged plan view of the texture region illustrated in FIG. 2 and further conducting Voronoi tessellation of the texture region based on the centers B. Voronoi tessellation is to determine the perpendicular bisectors of adjacent generatrices for a plurality of generatrices distributed in the plane and to divide the plane into cellular regions using the perpendicular bisectors obtained.

In the present embodiment, the texture region is subjected to Voronoi tessellation into cellular regions with the center B of the circumscribed circle of each projection region 20 as a "generatrix". Then, the case where two cellular regions corresponding to arbitrarily extracted projection regions have a common boundary (Voronoi boundary) is defined as the "projection regions being adjacent to each other".

The projection regions 20 can be formed, for example, by using an ink (ink for projection regions) consisting of a resin composition containing particles and a binder resin. The "ink for projection regions" may be referred to as "ink for heaping layers". When the ink for projection regions (ink for heaping layers) is used to form the projection regions, a gap region is formed between the projection regions at the same time.

Preferable examples of the binder resin for the projection regions 20 include urethane resins, acrylic polyol resins, acrylic resins, ester resins, amide resins, butyral resins, styrene resins, urethane-acrylic copolymers, polycarbonate urethane-acrylic copolymers (urethane-acrylic copolymers derived from a polymer (polycarbonate polyol) having a carbonate bond in the polymer main chain and two or more hydroxyl groups in the terminal and side chains), vinyl chloride-vinyl acetate copolymer resins, vinyl chloride-vinyl acetate-acrylic copolymer resins, chlorinated propylene resins, nitrocellulose resins (nitrocellulose), cellulose acetate resins, and fluorine resins, and these can be used individually or in combination of two or more, for example.

Examples of the particles contained in the projection regions 20 include organic fillers such as acrylic resins, urethane resins, nylon resins, polypropylene resins, and urea resins. Since the heat resistance is good, the particles are not easily buried in the lower layer after the baking process so that it is easy to maintain the height, the particles are likely to aggregate, and the average diameter of the circumscribed circles of the projection regions tends to fall within the aforementioned range, acrylic resins are particularly preferable.

The particle size of the particles 21 is 5 µm or more and 60 µm or less. The particles of less than 5 µm cannot give a sufficient tactile. The particles is preferably 10 µm or more, more preferably 30 µm or more. Further, when the particles are larger than 60 µm, the particles tend to fall out, and the tactile of the texture region deteriorates. In particular, in the case of forming the projection regions by gravure printing, the particles cannot enter the cells of the plate, or the number of the particles that enter there is reduced, and therefore it becomes difficult to obtain a desired tactile. The particle size is preferably 50 µm or less, more preferably 40 µm or less.

In this description, the particle sizes of various particles are 50% particle sizes (d50: median diameters) when the particle size distribution measured by the dynamic light scattering method is expressed by volume cumulative distribution.

The content of the particles is preferably 15 parts by mass or more, more preferably 20 parts by mass or more, further preferably 25 parts by mass or more, with respect to 100 parts by mass of the binder resin constituting the projection regions 20. The content of the particles falling within such a range allows the particles each other to easily aggregate. Therefore, an excellent tactile can be obtained, and an excellent visual effect is also obtained, so that a three-dimensional design can be obtained. Meanwhile, for reliably bonding the particles with the binder resin to suppress falling off and improving the fluidity of the resin composition to facilitate the forming process, the content of the particles is preferably 50 parts by mass or less, more preferably 45 parts by mass or less, further preferably 40 parts by mass or less, with respect to 100 parts by mass of the binder resin.

The projection region 20 may further comprise an inorganic filler. Examples of the inorganic filler include silica, clay, heavy calcium carbonate, light calcium carbonate, precipitated barium sulfate, calcium silicate, and synthetic silicate. The size of the inorganic filler is preferably 1 µm or more and 20 µm or less, more preferably 2 µm or more and 10 µm or less, further preferably 3 µm or more and 7 µm or less. The size of the inorganic filler is preferably selected in consideration of the particle size described above or the like so as not to affect the tactile by the particles.

The content of the inorganic filler is preferably 1 part by mass or more and 40 parts by mass or less, more preferably 2 parts by mass or more and 30 parts by mass or less, further preferably 3 parts by mass or more and 25 parts by mass or less, with respect to 100 parts by mass of the binder resin constituting the projection regions 20.

In this way, the gloss difference between the texture region and the other region can be increased to facilitate imparting a luxury design to the decorative material by containing the inorganic filler in addition to the aforementioned particles.

The ink for projection regions (ink for heaping layers) may contain an organic solvent, as needed. The organic solvent to be used is not particularly limited, but it is preferable to appropriately select an organic solvent in consideration of the viscosity of the ink and the evaporation rate of the solvent.

Specifically, when the viscosity coefficient of the solvent is excessively low, the viscosity of the ink decreases, and thus the resin is insufficient even if the aggregates of the particles are formed, which may make it difficult to form the projection regions and to obtain a good tactile. Meanwhile, when a solvent with a high viscosity coefficient is used, the viscosity of the ink increases, and thus the application property tends to deteriorate. Further, in the case of forming projection regions by gravure printing, individual cells are formed independently, or the particles are buried in the resin, thereby making it difficult to obtain a good tactile. Further, when the evaporation rate of the solvent is excessively slow, it is difficult to form large projection regions, which makes it difficult to obtain a good tactile.

From the above circumstances, selecting an organic solvent having appropriate viscosity coefficient and evaporation rate enables a decorative material having a good tactile to be obtained. The organic solvent may be one type or may be a mixed solvent in which a plurality of types are mixed. Specifically, examples of an organic solvent having a suitable viscosity coefficient include xylene, cyclohexanone, toluene, methyl isobutyl ketone, butyl acetate, methoxy propyl acetate, and propylene glycol monomethyl ether propionate (Methotate). Examples of a solvent having a high evaporation rate include cyclohexanone. In particular, a mixed solvent of xylene and cyclohexanone (mixed solvent at a weight ratio of 1:1) is preferably used.

The projection region 20 may further comprise bright particles. The projection region 20 having bright particles can enhance the design of the decorative material. In particular, in the case of using a metal base material as a base material, the reflection of the metal base material can enhance the effect due to the bright particles more.

Examples of the bright particles include one or more selected from metallic pigments consisting of metal scales or powder, pearl pigments using glass base materials or mica base materials, pearl pigments such as other various pearl pigments, glass scales, metal-coated glass scales with a metal thin film coated on the surface, phosphorescent pigments, and hologram glitters. Among the bright particles, flaky bright particles such as pearl pigments, glass scales, metal-coated glass scales, metal scales are preferable. Among them, pearl pigments are preferable, and pearl pigments using glass base materials are particularly preferable.

The average particle size of the bright particles may be 5 µm or more and is preferably 20 µm or more. Further, the average particle size of the bright particles may be 80 µm or less and is preferably 60 µm or less. The average particle size is a value measured by the laser diffraction method.

In the case where the bright particles are non-spherical like flakes, the maximum length of the bright particles preferably falls within the later-described range. The maximum length of the flat surface portion is preferably 5 µm or more and 90 µm or less, more preferably 10 µm or more and 60 µm or less. The flaky bright particles preferably have an aspect ratio of the maximum length of the flat surface portion to the thickness (maximum length/thickness) of 10 or more and 180 or less. The length of the flaky bright particles means the maximum length in the plane direction when the particles are observed with a microscope. The thickness of the flaky bright particles is obtained by dividing a cross-sectional image of the particles obtained by microscopy into a plurality of regions with uniform lengths in the length direction and averaging the measured values of the center thickness of respective regions.

Examples of the pearl pigments using glass substrates specifically include particles with a metal oxide coating layer formed on a flaky glass substrate. Examples of the glass substrate include scaly glass and glass flakes. Examples of the metal oxide of the coating layer include titanium oxide and iron oxide. The color development of the pigment can be different by changing the material and the film thickness of the coating layer. The glass pigment to be contained in the ink may be one type or a plurality of types.

Examples of other pearl pigments include a scaly matrix such as mica and aluminum coated with a coating layer consisting of a metal oxide such as titanium dioxide, ferric oxide.

In this way, a pearl pigment is not a metal itself, but is mainly composed of a metal oxide, which is a colorant capable of producing a metallic luster. In the present embodiment, any of a white pearl pigment, an interference pearl pigment, and a colored pearl pigment can be used as the pearl pigment.

Examples of the material of the metal scales include metals and alloys such as aluminum, gold, silver, brass, titanium, chromium, nickel, nickel chromium, and stainless steel.

The metal-coated glass scales are particles with a coating layer of a metal thin film formed on the surface of flakey or scaly glass substrate. Examples of the glass constituting the glass substrate include soda glass, potassium glass, phosphate glass, boron silicate glass, and lead glass. Examples of the metal include metals and alloys such as aluminum, gold, silver, brass, titanium, chromium, nickel, nickel chromium, and stainless steel.

In view of imparting a design with high brightness due to the bright particles and increasing the contrast between the region where the bright particles are present and the region where they are absent, the content of the bright particles is preferably 3 parts by mass or more, more preferably 10 parts by mass or more, further preferably 15 parts by mass or more, with respect to 100 parts by mass of the binder resin. Further, in view of capable of imparting a design with a matte feeling due to an organic filler or an inorganic filler, which will be described below, it is preferably 40 parts by mass or less, more preferably 30 parts by mass or less, further preferably 20 parts by mass or less, with respect to 100 parts by mass of the binder resin.

The projection regions 20 preferably contain a weathering agent such as an ultraviolet absorber and a light stabilizer, in view of improving the weather resistance.

Hereinafter, each layer other than the heaping layer 7 will be described in detail.

[Base Material]

The base material 2 is not particularly limited, as long as it is commonly used as a decorative material. For example, resin base materials, metal base materials, ceramic base material, fibrous base material, woody base materials, or the like can be appropriately selected corresponding to the application. Each of the aforementioned base materials may be used individually or may be a laminate in any combination. In the case where the base material 2 is a laminate, an adhesive layer may be further provided between each two layers of the laminate.

Examples of the resin base materials include those consisting of various synthetic resins. Examples of the synthetic resins include polyethylene resins, polypropylene resins, polymethylpentene resins, polyvinyl chloride resins, polyvinylidene chloride resins, polyvinyl alcohol resins, vinyl chloride-vinyl acetate copolymer resins, ethylene-vinyl acetate copolymer resins, ethylene-vinyl alcohol copolymer resins, polyethylene terephthalate resins, polybutylene terephthalate resins, polyethylene naphthalate-isophthalate copolymer resins, polymethylmethacrylate resins, polymethylmethacrylate resins, polybutyl acrylate resins, polyamide resins typified by nylon 6 or nylon 66, cellulose triacetate resins, cellophane, polystyrene resins, polycarbonate resins, polyarylate resins, and polyimide resins.

Examples of the metal base materials include pure metals consisting of a single metal element such as aluminum, iron, copper, and titanium, and those consisting of alloys such as carbon steel, stainless steel, duralumin, brass, and blue copper containing one or more of these metals. Further, these metals processed by plating or the like can also be used.

Since metal base materials have excellent heat resistance, they are resistant to deformation or the like during heat treatment at high temperature (drying process after formation of a base coating layer and the final baking process) in the manufacturing method described later and thus are preferable. Since metal base materials have the aforementioned properties, they enable the shape of the texture region to be easily maintained. Further, in the case where the projection regions 20 have bright particles, use of a metal base material can enhance the effects due to the bright particles more by the reflection of the metal base material.

Examples of the ceramic base materials include gypsum boards, calcium silicate plates, ceramic construction materials such as wood cement boards, ceramics, glass, enamel, and baked tiles. Since ceramic base materials also have excellent heat resistance, they are resistant to deformation or the like during heat treatment at high temperature in the manufacturing method described later and thus are preferable.

As a fibrous base material, paper base materials such as thin paper, kraft paper, titanium paper, linter paper, paperboards, and base paper for gypsum boards can be used, for example. These paper base materials may be further supplemented with resins such as acrylic resins, styrene butadiene rubber, melamine resins, urethane resins (resin impregnation after papermaking or filling during papermaking) for enhancing the strength between the fibers of the paper base material or the interlayer strength between another layer and such a paper base material or preventing fluffing. Examples of the paper base material supplemented with resins include inter-paper reinforced paper and resin-impregnated paper.

Further, a vinyl wallpaper raw fabric or the like with a vinyl chloride resin layer provided on the surface of a paper base material also can be used as a fibrous base material.

Further, examples of the fibrous base materials include woven fabrics and non-woven fabrics of various fibers having a paper-like appearance and properties, although they are distinguished from the aforementioned paper base materials. Examples of the various fibers include inorganic fibers such as glass fibers, asbestos fibers, potassium titanate fibers, alumina fibers, silica fibers, and carbon fibers. Further, examples of the various fibers include synthetic resin fibers such as polyester fibers, acrylic fibers, and viniron fibers. The papers are preferably used while being laminated with a plastic base material having excellent excipient suitability in view of the excipient suitability of the irregular pattern.

Examples of the woody base materials include wood veneers, plywoods, laminated woods, particle boards, and medium-density fiberboards (MDF).

The thickness of the base material 2 is not particularly limited and can be appropriately set according to the application, required specification and the like. For example, the thickness of the base material 2 is preferably 0.2 mm or more and 5 mm or less, more preferably 0.4 mm or more and 3 mm or less.

[Primer Layer]

The primer layer 3 is provided between the base material 2 and the pattern layer 5, as required. The primer layer 3 serves to ensure good adhesion between the base material 2 and the pattern layer 5.

An ink (ink for primer layers) consisting of a resin composition containing a binder resin is used for forming the primer layer 3. The ink for primer layers may appropriately contain a solvent.

Preferable examples of the binder resin include resins such as urethane resins, acrylic polyol resins, acrylic resins, ester resins, amide resins, butyral resins, styrene resins, urethane-acrylic copolymers, polycarbonate urethane-acrylic copolymers (urethane-acrylic copolymers derived from a polymer (polycarbonate polyol) having a carbonate bond in the polymer main chain and having two or more hydroxyl groups in the terminal and side chains), vinyl chloride-vinyl acetate copolymer resins, vinyl chloride-vinyl acetate-acrylic copolymer resins, chlorinated propylene resins, nitrocellulose resins (nitrocellulose), cellulose acetate resins, and fluorine resins, and these can be used individually or in combination of two or more.

In addition to one-component curable resins, resins of various types including two-component curable resins with a curing agent such as isocyanate compounds, e.g., tolylene diisocyanate (TDI), diphenylmethane diisocyanate (MDI), hexamethylene diisocyanate (HDI), isophorone diisocyanate (IPID), and xylylene diisocyanate (XDI) can be used.

The type of the binder resin can be selected in consideration of the material of the base material 2 and the material of the binder resin of the pattern layer 5 described later. For example, as will be described later in the manufacturing method, in the case of baking after forming the pattern layer 5 in a decorative material using a metal plate as a base material, ester resins (such as alkyd resins, epoxy resins, and urethane resins) are preferably selected as a binder resin of the primer layer.

In view of improving the weather resistance, the primer layer 3 preferably contains a weathering agent such as an ultraviolet absorber and a light stabilizer.

In view of the effect of improving the adhesion between layers or the like, the thickness of the primer layer 3 is preferably 1 µm or more, more preferably 2 µm or more, further preferably 3 µm or more. Further, the upper limit of the thickness of the primer layer 3 is preferably 10 µm or less, more preferably 7 µm or less, further preferably 5 µm or less.

[Base Coating Layer]

The base coating layer 4 is a layer provided between a substrate 2 and the surface coating layer 8, as required. The base coating layer 4 can be colored in any color, for example. In this way, the design of the decorative material can be enhanced by coloring the base coating layer in any color, so that the base coating layer serves as a base of the color of the decorative material.

The base coating layer 4 is generally formed as an opaque layer and serves to impart an intended color and hide the substrate 2 when viewed from a viewer. However, a semi-transparent layer or a transparent layer may be formed as the base coating layer 4, and the pattern or the color of the substrate 2 may be utilized. The base coating layer may be omitted, as required.

For forming the base coating layer 4, an ink consisting of a resin composition (ink for base coating layers) is used. The ink for base coating layers may appropriately contain a solvent.

The resin to be used for forming the base coating layer 4 is not particularly limited. Examples thereof include thermoplastic resins such as fluororesins, (meth)acrylic resins, polyurethane resins, polyester resins, polyamide resins, (meth)acrylic acid ester-olefin copolymer resins, vinyl chloride-acetate resins, ethylene-vinyl acetate copolymer resins (EVA resins), ionomer resins, and olefin-α olefin copolymer resins; and curable resins such as fluororesins, epoxy resins, phenolic resins, urea resins, polyester resins, melamine resins, alkyd resins, polyimide resins, silicone resins, hydroxyl functional acrylic resins, carboxyl functional acrylic resins, amide functional copolymers, and urethane resins. Here, the curable resins include thermosetting resins, ionizing radiation curable resins, and two-component curable resins.

Further, in the case of providing the base coating layer 4 as a hiding layer, the base coating layer 4 contains colorants such as pigments together with the aforementioned resins.

The colorants to be contained in the base coating layer 4 are not particularly limited. Examples thereof include inorganic pigments such as carbon black, iron black, titanium white, antimony white, titanium yellow, yellow iron, red iron oxide (Bengala), cadmium red, ultramarine, and cobalt blue; organic pigments or dyes such as quinacridone red, isoindolinone yellow, and phthalocyanine blue; metallic pigments consisting of scaly foil pieces such as aluminum and brass; and pearl pigments consisting of scaly foil pieces such as titanium dioxide-coated mica and basic lead carbonate. These colorants may be used individually or in combination of two or more.

The base coating layer 4 may contain various additives according to the desired physical properties in addition to the aforementioned components. Examples of the additives include weather resistance improvers such as ultraviolet absorbers and light stabilizers, abrasion resistance improvers, polymerization inhibitors, infrared absorbers, defoamers, and fillers. Further, in the case of using a curable resin for forming the base coating layer 4, a curing agent may be contained. Such an additive may be appropriately selected from those commonly used for use.

The thickness of the base coating layer 4 is not particularly limited and can be appropriately set according to the application and required specification. For example, the thickness of the base coating layer 4 is preferably 5 µm or more and 40 µm or less, preferably 10 µm or more and 30 µm or less.

[Pattern Layer]

The pattern layer 5 is provided on the front side of the base material 2, as required, and is a layer imparting a design to the decorative material. The pattern layer 5 may be provided on the entire surface of the base material 2 when viewed from the front side or may be partially provided.

The pattern of the pattern layer 5 is not particularly limited and a desired pattern can be employed. Examples thereof include grain patterns, marble patterns (for example, travertine marble patterns), stone patterns imitating the surface of rocks such as cleavage surfaces of granite plates, cloth patterns imitating cloth textures and cloth-like patterns, leather (leather grain) patterns expressing leather grains, tile patterns, brick patterns, hairlines, hatching grooves, satin-finished surfaces, sand grains, characters, symbols, and geometric patterns, and patterns of wooden mosaic and patchworks combining these.

The pattern layer 5 may have a single-layer structure or a structure in which a plurality of layers are laminated. For example, the pattern layer 5 may have a structure in which the layer on the base material side may be used as a base coating layer to be the basic color, and a pattern layer to serve as a picture pattern may be laminated on the base coating layer.

An ink (ink for pattern layers) consisting of a resin composition containing a binder resin and colorants is used for forming the pattern layer 5. The ink may appropriately contain a solvent.

Preferable examples of the binder resin include resins such as urethane resins, acrylic polyol resins, acrylic resins, polyester resins, alkyd resins, amide resins, butyral resins, styrene resins, urethane-acrylic copolymers, vinyl chloride-vinyl acetate copolymer resins, vinyl chloride-vinyl acetate-acrylic copolymer resins, nitrocellulose resins (nitrocellulose), cellulose acetate resins, and fluororesins. Further, curable resins such as a two-component curable resin containing polyol as a base resin and isocyanate as a curing agent may be used, for example. These can be used individually or in combination of two or more. For example, as will be described later in the manufacturing method, in the case of baking after forming the pattern layer 5 in a decorative material using a metal plate as a base material, a polyester resin is preferably selected as the binder resin of the pattern layer 5 in view of the processability.

Pigments, dyes, and combinations of these can be used as colorants to be used for the pattern layer 5. Examples of the pigments include inorganic pigments such as white pigments, e.g., titanium white, iron black, chrome yellow, titanium yellow, red iron oxide (Bengala), cadmium red, ultramarine, and cobalt blue; organic pigments or dyes such as quinacridone red, isoindolinone yellow, phthalocyanine blue, nickel-azo complexes, azomethine azo black pigments, and perylene black pigments; metal pigments consisting of scaly foil pieces such as aluminum and brass; and pearlescent (pearl) pigments consisting of scaly foil pieces such as titanium dioxide-coated mica and basic lead carbonate.

The pattern layer 5 may contain a weathering agent such as an ultraviolet absorber and a light stabilizer in view of improving the weather resistance.

The pattern layer 5 may contain a matting agent in view of obtaining a visual effect due to the gloss difference from the projection regions 20. Examples of the matting agent include organic fillers such as urethane resins, nylon resins, polypropylene resins, or urea resins; and inorganic fillers such as silica, clay, heavy calcium carbonate, light calcium carbonate, precipitated barium sulfate, calcium silicate, and synthetic silicate.

The particle size (volume-average particle size) of the matting agent is preferably 1 µm or more and 15 µm or less, more preferably 3 µm or more and 10 µm or less, further preferably 3 µm or more and 7 µm or less.

Further, the content of the matting agent with respect to 100 parts by mass of the binder resin in the pattern layer is preferably 5 parts by mass or more, more preferably 10 parts by mass or more, further preferably 20 parts by mass or more, and the upper limit is generally 100 parts by mass or less, preferably 80 parts by mass or less, more preferably 50 parts by mass or less, further preferably 30 parts by mass or less. The content of the matting agent falling within such a range can enhance the visual effect (gloss/matte effect) since it enables the pattern layer to be visually recognized as a layer with low gloss.

The thickness of the pattern layer 5 may be appropriately selected according to the desired pattern. The thickness of the pattern layer 5 is preferably 1 µm or more, more preferably 3 µm or more, further preferably 5 µm or more. The upper limit of the thickness of the pattern layer 5 is preferably 20 µm or less, more preferably 10 µm or less, further preferably 5 µm or less. In the case of forming the pattern layer using a plurality of layers, the total thickness of all layers is set to fall within such a range.

[Protective Layer]

The protective layer 6 is provided between the pattern layer 5 and the projection regions 20, as required. The protective layer 6 serves to protect the pattern layer 5, for example. For example, functions such as weather resistance, stain resistance, and chemical resistance may be imparted to the protective layer 6. The protective layer is provided, as required, in order to impart such a function. The protective layer 6 may be provided on the entire surface of the base material 2 when viewed from the front side or may be partially provided.

An ink (ink for protective layers) consisting of a resin composition containing a binder resin is used for forming the protective layer 6. The ink for protective layers may appropriately contain a solvent.

Preferable examples of the binder resin include resins such as urethane resins, acrylic polyol resins, acrylic resins, polyester resins, alkyd resins, amide resins, butyral resins, styrene resins, urethane-acrylic copolymers, vinyl chloride-vinyl acetate copolymer resins, vinyl chloride-vinyl acetate-acrylic copolymer resins, nitrocellulose resins (nitrocellulose), cellulose acetate resins, and fluorine resins. Further, curable resins such as a two-component curable resin containing polyol as a base resin and isocyanate as a curing agent may be used, for example. These can be used individually or in combination of two or more.

The protective layer 6 preferably has higher gloss than the projection regions 20, for improving the visual effect (gloss/ matte effect) due to the gloss difference from the projection regions 20. The protective layer 6 preferably contains a matting agent, as required.

Examples of the matting agent include inorganic fillers such as silica, clay, heavy calcium carbonate, light calcium carbonate, precipitated barium sulfate, calcium silicate, synthetic silicate, and silicic acid fine powder. The volume-average particle size of the matting agent is preferably 1 μm or more and 20 μm or less, more preferably 3 μm or more and 10 μm or less, further preferably 3 μm or more and 7 μm or less.

Further, the content of the matting agent with respect to 100 parts by mass of the binder resin in the protective layer 6 is preferably 1 part by mass or more, more preferably 2 parts by mass or more, further preferably 5 parts by mass or more, and the upper limit is generally 100 parts by mass or less, preferably 80 parts by mass or less, more preferably 50 parts by mass or less, further preferably 30 parts by mass or less. The content of the matting agent falling within such a range enables an excellent visual effect (gloss/matte effect) to be obtained.

The protective layer 6 may contain a weathering agent such as an ultraviolet absorber and a light stabilizer in view of improving the weather resistance.

The thickness of the protective layer 6 may be appropriately selected according to the desired pattern. The protective layer 6 is preferably 2 μm or more, more preferably 4 μm or more, further preferably 6 μm or more. Further, the upper limit of the thickness is preferably 20 μm or less, more preferably 15 μm or less, further preferably 10 μm or less.

[Surface Coating Layer]

The surface coating layer 8 may be formed on the outermost surface of the decorative material 1 on the side having the texture region, as required, for improving resistance such as weather resistance, scratch resistance, abrasion resistance, and stain resistance. In the case of forming the surface coating layer on the heaping layer, the projection regions of the texture region and the gap region can be formed by the heaping layer and the surface coating layer.

An ink (ink for surface coating layers) consisting of a resin composition is used for forming the surface coating layer 8. The ink for surface coating layers may appropriately contain a solvent.

The resin to be used for forming the surface coating layer 8 is not particularly limited. Examples thereof include thermoplastic resins such as (meth)acrylic resins, polyurethane resins, polyester resins, polyamide resins, (meth) acrylic acid ester-olefin copolymer resins, vinyl chloride-acetate resins, ethylene-vinyl acetate copolymer resins (EVA resins), ionomer resins, and olefin-α olefin copolymer resins; epoxy resins, phenolic resins, urea resins, unsaturated polyester resins, melamine resins, alkyd resins, polyimide resins, silicone resins, hydroxyl functional acrylic resins, carboxyl functional acrylic resins, amide functional copolymers, urethane resins, and fluororesins. These resins may be used individually or in combination of two or more.

The surface coating layer 8 may contain various additives according to the desired physical properties. Examples of the additives include weather resistance improvers such as ultraviolet absorbers (e.g., benzotriazole ultraviolet absorbers and triazine ultraviolet absorbers), light stabilizers (e.g., hindered amine radical scavengers), abrasion resistance improvers (e.g., particles of silica, alumina, and kaolinite), polymerization inhibitors, infrared absorbers, defoamers, and fillers.

The thickness of the surface coating layer 8 is preferably 5 μm or more, more preferably 10 μm or more, further preferably 15 μm or more, in order to impart resistance and gloss to the surface of the decorative material 1. Meanwhile, the upper limit of the thickness of the surface coating layer 8 is preferably 40 μm or less, more preferably 35 μm or less, more preferably 30 μm or less, more preferably 25 μm or less, more preferably 20 μm or less, in consideration of the time and energy required for drying and curing the surface coating layer and the material cost. Further, the upper limit of the thickness of the surface coating layer 8 falling within such a range is preferable since the shape of the heaping layer is easily maintained.

Specifically, the decorative material of the present embodiment can be exemplified by the following laminate structures. The symbol "/" means the boundaries between layers.

(1) Base material/primer layer/base coating layer/pattern layer/protective layer/heaping layer/surface coating layer (2) Base material/primer layer/base coating layer/pattern layer/protective layer/heaping layer (3) Base material/primer layer/base coating layer/pattern layer/heaping layer/surface coating layer

[Method for Manufacturing Decorative Material]

The method for manufacturing decorative material of the present embodiment is a method for manufacturing decorative material comprising a step of forming a texture region on a base material, wherein the texture region is composed of projection regions independent of each other and a gap region between the projection regions, each of the projection regions comprises a plurality of particles with a particle size of 5 μm or more and 60 μm or less, and the average diameter of the circumscribed circles of the projection regions, when the texture region is viewed in plan view, is 100 μm or more and 500 μm or less.

In the method for manufacturing decorative material described above, the texture region can be formed, for example, by any of the following methods (A) and (B):

(A) forming the texture region by applying an ink for heaping layers onto the base material and drying it; and (B) forming the texture region by transferring a transfer layer of a transfer sheet having the transfer layer onto a peelable base material to the base material.

In the method (A) above, a common means may be employed as the means for applying and drying the ink for heaping layers.

In the method (B) above, the surface shape of the peelable base material of the transfer sheet preferably has a shape complementary to the shape of the texture region. The transfer layer formed on the peelable base material having such a shape can allow the surface shape after transfer to be the shape of the texture region.

Hereinafter, the case of using a metal plate as a base material will be described as an example, and the specific example of the method for manufacturing decorative material of the present embodiment will be further described.

(1) Primer Layer-Forming Step

An ink for primer layers is applied onto one surface of a metal plate (base material). The ink for primer layers is preferably applied onto the entire surface of the metal plate. Examples of the application method can include roll coating, reverse coating, air spray coating, electrostatic coating, and powder coating.

After the application, the ink is heated and dried under the condition of 100° C. or more and 300° C. or less, to form a primer layer.

(2) Base Coating Layer-Forming Step

An ink for base coating layers is applied onto the primer layer. This step can be omitted.

The ink for base coating layers is preferably applied onto the entire surface of the primer layer. Examples of the application method can include flow coater coating, roll coating, reverse coating, air spray coating, electrostatic coating, and powder coating.

After the application, drying is performed under the condition at a heating temperature (temperature of the base material reached) of 165° C. or more and 270° C. or less (preferably 200° C. or more and 250° C. or less). This allows a base coating layer to be formed.

Thermal curing of the ink for base coating layers within such a temperature range allows a base coating layer having a sufficient hardness to be formed. Therefore, the lower layers of the projection regions 20 are suppressed from recessing in the part where the particles are present due to baking after forming the heaping layer 7, thereby enabling the projection regions 20 having sufficient heights to be formed. Further, the particles in the projection regions 20 easily aggregate at the time of baking after forming the heaping layer 7, thereby enabling the average diameter of the circumscribed circles to easily satisfy the aforementioned range. As a result, a decorative material having a good tactile can be obtained. In particular, heating the base coating layer at 200° C. or more enables a decorative material having an excellent tactile to be obtained.

Meanwhile, a drying temperature of less than 165° C. (temperature of the base material reached) cause the lower layers to recess, so that the heights of the projection regions 20 decrease, and a sufficient tactile cannot be obtained.

(3) Pattern Layer-Forming Step

An ink for pattern layers is applied onto the base coating layer with any pattern. Examples of the application method can include gravure printing, offset printing, flexographic printing, letterpress printing, screen printing, ink jet printing, and transfer printing. After the application, the ink for pattern layers is dried, to form a pattern layer.

(4) Protective Layer-Forming Step

An ink for protective layers is applied onto the pattern layer. The ink for protective layers is preferably applied onto the entire surface of the metal plate. Examples of the application method can include gravure printing, offset printing, flexographic printing, letterpress printing, and screen printing.

After the application, the ink is heated and dried under the condition of 150° C. or more and 250° C. or less (temperature of the base material reached), to form a protective layer.

In the case where the protective layer is not formed, this step can be omitted.

(5) Heaping Layer-Forming Step

A heaping layer is formed at the point on the protective layer or the pattern layer to serve as the texture region. This allows the texture region including a plurality of projection regions and a gap region between the projection regions to be formed.

Specifically, an ink for projection regions (ink for heaping layers) is applied onto the protective layer or the pattern layer. The ink for heaping layers may be applied onto the entire surface of the metal plate or may be partially applied thereto. In particular, it is particularly preferable to apply the ink corresponding to the pattern of the pattern layer since a tactile corresponding to the pattern is obtained.

In the present embodiment, the ink for heaping layers is preferably applied by gravure printing. A gravure printing plate has a plurality of cells on a surface. Immediately after printing, the cell-shaped ink printed from the individual cells on the base material side is independent of each other, but the inks in the form of the plurality of cells are integrated at random partially in the texture region during the process from printing to drying, to form projection regions. Further, a gap region between the projection regions is formed at the same time. Use of gravure printing enables projection regions having such an average diameter of the circumscribed circles described above to be easily formed. Among the gravure printing, gravure offset printing is particularly preferable since integration of the inks in the form of adjacent cells easily proceeds on a rubber cylinder. In this step, projections may be formed by printing once or may be formed by printing multiple times.

Further, the ink for heaping layers containing an organic solvent having an appropriate viscosity coefficient and an appropriate evaporation rate enables the inks in the form of adjacent cells to be easily integrated. However, if the inks have an excessively low viscosity, the integration becomes less likely to occur, and thus it is preferable to set the content of the particles to fall within the aforementioned range or to select the solvent as described above.

Further, use of gravure printing enables the aforementioned area percentage, $D/d_{ave}$, and the shortest distance between the projection regions to be easily satisfied.

(6) Surface Coating Layer-Forming Step

An ink for surface coating layers is applied onto the heaping layer. This step can be omitted.

The ink for surface coating layers is preferably applied onto the entire surface of the decorative material. Examples of the application method can include flow coater coating, roll coating, reverse coating, air spray coating, electrostatic coating, and powder coating.

After the application, the ink is heated and dried under the condition of 100° C. or more and 300° C. or less, to form a surface coating layer.

(7) Baking Step

After the formation of the heaping layer or the surface coating layer, baking is performed under the condition at a heating temperature (temperature of the base material reached) of 150° C. or more and 270° C. or less (preferably 200° C. or more and 250° C. or less).

[Laminate]

The laminate of the present embodiment comprises an adherend and the decorative material of the present embodiment laminated on the adherend. The adherend and the decorative material are preferably fixed with an adhesive layer, tacks, or the like.

The adherend can be appropriately selected corresponding to the application of the laminate. Examples of the adherend include metal materials, wood materials, ceramic materials, and resin materials.

[Applications of Decorative Material and Laminate]

The decorative material and laminate of the present embodiment can be used, for example, as a surface decorative board of interior materials or exterior materials.

Examples of the interior materials include surface materials of interior building materials such as walls, floors, and ceilings; surface materials of interior fittings such as partitions, doors, window frames, handrails, surrounding edges, and modular baths; interior materials of vehicles such as cars and electric trains; and surface materials of home appliances.

Examples of the exterior materials include surface materials of exterior building materials such as roofs, walls, floors, balcony blindfolds, space under the eaves, and ceilings; surface materials of exterior fittings such as entrance doors, doors, window frames, handrails, surrounding edges, and moldings; and exterior materials of vehicles such as cars and electric trains.

EXAMPLES

Then, the decorative material and the method for manufacturing decorative material of the present disclosure will be described further in detail by way of examples, but the present embodiment is not limited by these examples at all.
[Measurement and Evaluation]
The decorative materials produced in Examples and Comparative Examples were measured and evaluated as follows. Table 1 shows the results.
<Tactile>
The texture region of each decorative material produced was checked by finger touch. Twenty human subjects were subjected to evaluation. Those that made them to strongly feel irregularities were evaluated as 2 points, those that made them to feel irregularities were evaluated as 1 point, and those that made them to hardly feel irregularities were evaluated as 0 points, to calculate each average point. According to the average point obtained, evaluation was made using the following indices.
  A: Those with an average point of 1.5 or more
  B: Those with an average point of 1.2 or more and less than 1.5
  C: Those with an average point of less than 1.2
<Observation with Optical Microscope (Fine Shape of Texture Region)>
The texture region of the decorative material produced was observed with an optical microscope (digital microscope VHX-2000, available from KEYENCE) under the condition at a magnification of 200 to 700 times. Those in which a large number of projection regions where the plurality of particles aggregates were observed were evaluated as A, and those in which the particles were seen, but almost no aggregates were observed were evaluated as C.
<Calculation of Area Percentage>
Each of the decorative materials of Examples and Comparative Examples were binarized using the optical microscope image described above (magnification: 300 times). Projection regions were extracted from the image after the binarization, to calculate the area percentage of the projection regions with respect to the entire image.
<Average Diameter of Circumscribed Circles>
For each of the decorative materials of Examples and Comparative Examples, the diameters of the circumscribed circles of all the projection regions that can be observed in the image after the binarization were calculated. Further, the average diameter of the circumscribed circles obtained (average diameter) was calculated.
<$D/d_{Ave}$>
For each of the decorative materials of Examples and Comparative Examples, five sets of adjacent projection regions were selected using the optical microscope image (magnification: 300 times) described above. For each set, the average $d_{ave}$ of the diameters of the circumscribed circles and the distance D between the centers of the circumscribed circles were calculated, to obtain $D/d_{ave}$. Further, the average of the $D/d_{ave}$ obtained was calculated.
<Heights (Average Height) of Projection Regions>
For each of the decorative materials of Examples and Comparative Examples, the optical microscope image (magnification: 700 times) described above was analyzed by high-quality depth synthesis 3D, to measure the average height of the projection regions. The average height was determined from the heights of the projection regions by drawing four lines each passing through the center of the circumscribed circle of the projection region on the four lines to divide the circumscribed circle into eight equal parts and averaging the heights from the region where no projection region was present.

Example 1

An ink for primer layers 1 prescribed as follows was applied onto the entire surface of a steel plate (SGCC-QM, size: 800 mm×2000 mm, thickness: 0.6 mm) by roll coating so that the film thickness after drying was 2 μm. Thereafter, it was dried at 230° C. (temperature of the base material reached) to form a primer layer.
<Ink for Primer Layers 1>
  Thermosetting polyester resin
  Solvent (mixed solvent of propylene glycol monomethyl ether acetate, cyclohexanone, and SWASOL #1500)
  Solid content: 74%
The ink for base coating layers prescribed as follows was applied onto the entire surface of the primer layer using a curtain flow coater so that the film thickness after drying was 22 μm. Thereafter, it was dried at 210° C. (temperature of the base material reached) to form a base coating layer.
<Ink for Base Coating Layers>
  Thermosetting polyester resin
  Colorants (carbon black, titanium oxide (titanium white), iron oxide (red iron oxide (*Bengala*)), and yellow iron oxide (yellow iron)): 25 parts by mass with respect to 100 parts by mass of the resin
  Solvent (xylene and cyclohexanone)
  Solid content: 35%
A pattern layer with a predetermined pattern was formed on the base coating layer. An ink for pattern layers containing a thermosetting polyester resin and colorants was applied onto the entire surface of the base coating layer by gravure printing so that the film thickness after drying was 1 μm. Thereafter, it was dried to form a pattern layer with a grain pattern.
An ink for protective layers prescribed as follows was applied onto the entire surface of the pattern layer by gravure offset printing so that the film thickness after drying was 2 μm.
<Ink for Protective Layers>
  Thermosetting acrylic resin
  Silica: 8 parts by mass with respect to 100 parts by mass of the resin
  Solvent (xylene and cyclohexanone)
A heaping layer corresponding to the pattern of the pattern layer was formed on the protective layer. This allowed a texture region including a plurality of projection regions and a gap region between the projection regions to be formed on the protective layer.
Specifically, an ink for heaping layers 1 prescribed as follows was applied onto the protective layer by gravure printing. A diagonal digging gravure plate cylinder was used for printing. The gravure plate cylinder used was made from the method in which a photosensitive resist film on the surface of the metal plate material was exposed to a laser beam and then the metal plate material was corroded to form a desired cell pattern.
<Ink for Heaping Layers 1>
  Thermosetting acrylic resin
  Silica: 8 parts by mass with respect to 100 parts by mass of the resin Acrylic beads (30 μm diameter): 20 parts by mass with respect to 100 parts by mass of the resin
Solvent (xylene and cyclohexanone)
Solid content: 40%

After formation of the heaping layer, baking was performed under the condition at 220° C. (temperature of the base material reached). Thus, the decorative material of Example 1 was obtained.

Example 2

The decorative material of Example 2 was obtained in the same manner as in Example 1 except that the drying temperature of the base coating layer (temperature of the base material reached) was changed to 180° C.

Example 3

An ink for primer layers 2 prescribed as follows was applied onto the entire surface of a steel plate (SGCC-QM, size: 800 mm×2000 mm, thickness: 0.6 mm) by roll coating so that the film thickness after drying was 2 μm. Thereafter, it was dried at 230° C. (temperature of the base material reached) to form a primer layer.
<Ink for Primer Layers 2>
Thermosetting polyester resin
Solvent (mixed solvent of propylene glycol monomethyl ether acetate, cyclohexanone, and SWASOL #1500)
Solid content: 74 mass %

An ink for base coating layers 2 prescribed as follows was applied onto the entire surface of the primer layer using a curtain flow coater so that the film thickness after drying was 22 μm. Thereafter, it was dried at 210° C. (temperature of the base material reached) to form a base coating layer.
<Ink for Base Coating Layers 2>
Thermosetting polyester resin: 100 parts by mass
Colorants (carbon black, titanium oxide (titanium white), iron oxide (red iron oxide (Bengala)), and yellow iron oxide (yellow iron)): 25 parts by mass
Solvent (xylene and cyclohexanone)
Solid content: 35 mass %

A pattern layer with a predetermined pattern was formed on the base coating layer. An ink for pattern layers containing a thermosetting polyester resin and colorants was applied onto the entire surface of the base coating layer by gravure printing so that the film thickness after drying was 1 μm. This allows a pattern layer with a stone pattern to be formed.

An ink for protective layers 2 prescribed as follows was applied onto the entire surface of the pattern layer by gravure offset printing so that the film thickness after drying was 2 μm.
<Ink for Protective Layers 2>
Thermosetting acrylic resin: 100 parts by mass
Silica: 8 parts by mass
Solvent (xylene and cyclohexanone)

A heaping layer was formed on the entire surface of the protective layer. This allowed a texture region including a plurality of projection regions and a gap region between the projection regions to be formed on the protective layer.

Specifically, an ink for heaping layers 2 prescribed as follows was applied onto the entire surface of the protective layer by gravure printing. A diagonal digging gravure plate cylinder was used for printing. The gravure plate cylinder used was made from the method in which a photosensitive resist film on the surface of the metal plate material was exposed to a laser beam and then the metal plate material was corroded to form a desired cell pattern.
<Ink for Heaping Layers 2>
Thermosetting acrylic resin: 100 parts by mass
Bright flat particles (glass flake 2025PSTM, available from Nippon Sheet Glass Co., Ltd.): 7 parts by mass
Silica: 20 parts by mass
Acrylic beads (30 μm diameter): 20 parts by mass
Solvent (butyl carbitol, xylene, and cyclohexanone)
Solid content: 40 mass %

After formation of the heaping layer, baking was performed under the condition at 220° C. (temperature of the base material reached). Thus, the decorative material of Example 3 was obtained.

Example 4

An ink for primer layers 3 prescribed as follows was applied onto the entire surface of an aluminum plate (A3004PH32, size: 1220 mm×2440 mm, thickness: 0.6 mm) by roll coating so that the film thickness after drying was 2 μm. Thereafter, it was dried at 230° C. (temperature of the base material reached) to form a primer layer.
<Ink for Primer Layers 3>
Thermosetting polyester resin
Solvent (propylene glycol monomethyl ether acetate, cyclohexanone, and SWASOL 1500)
Solid content: 34 mass %

An ink for base coating layers 3 prescribed as follows was applied onto the entire surface of the primer layer using a curtain flow coater so that the film thickness after drying was 22 μm. Thereafter, it was dried at 210° C. (temperature of the base material reached) to form a base coating layer.
<Ink for Base Coating Layers 3>
Thermosetting polyester resin
Solvent (xylene and cyclohexanone)
Solid content: 35 mass %

A pattern layer with a predetermined pattern was formed on the base coating layer. An ink for pattern layers containing a thermosetting polyester resin and colorants was applied onto the entire surface of the base coating layer by gravure printing so that the film thickness after drying was 1 μm. This allowed a pattern layer with a stone pattern to be formed.

A heaping layer corresponding to the pattern of the pattern layer was formed on the pattern layer. This allowed a texture region including a plurality of projection regions and a gap region between the projection regions to be formed.

Specifically, an ink for heaping layers 3 prescribed as follows was applied onto the pattern layer by gravure printing. A diagonal digging gravure plate cylinder was used for printing. The gravure plate cylinder used was made from the method in which a photosensitive resist film on the surface of the metal plate material was exposed to a laser beam and then the metal plate material was corroded to form a desired cell pattern.
<Ink for Heaping Layers 3>
Thermosetting acrylic resin
Silica: 8 parts by mass with respect to 100 parts by mass of the resin
Acrylic beads (30 μm diameter): 20 parts by mass with respect to 100 parts by mass of the resin
Solvent (xylene and cyclohexanone)
Solid content: 40%

An ink for surface coating layers prescribed as follows was applied onto the entire surface of the heaping layer and the exposing pattern layer using a flow coater so that the film thickness after drying was 18 μm. Thereafter, baking was performed under the condition at 220° C. (temperature of the base material reached). Thus, the decorative material of Example 4 was obtained.
<Ink for Surface Coating Layers>
 Thermosetting acrylic resin
 Solvent (xylene and cyclohexanone)
 Solid content: 40%

Comparative Example 1

The decorative material of Comparative Example 1 was obtained in the same manner as in Example 1 except that the drying temperature of the ink for base coating layers was changed to 160° C. (temperature of the base material reached), and the ink for heaping layers was prescribed as follows.
<Ink for Heaping Layers of Comparative Example 1>
 Thermosetting acrylic resin
 Silica: 12 parts by mass with respect to 100 parts by mass of the resin
 Nylon beads (20 μm diameter): 12 parts by mass with respect to 100 parts by mass of the resin
 Solvent (xylene and cyclohexanone)
 Solid content: 40%

TABLE 1

|  | Example 1 | Example 2 | Example 3 | Example 4 | Comparative Example 1 |
|---|---|---|---|---|---|
| Tactile | A | B | A | B | C |
| Fine shape | A | A | A | A | C |
| Average diameter of circumscribed circles (μm) | 250 | 260 | 210 | 230 | 73 |
| Area percentage (%) | 37 | 30 | 34 | 31 | 2 |
| $D/d_{ave}$ | 1.6 | 1.2 | 1.4 | 1.2 | 6.1 |
| Average height (μm) | 20 | 10 | 23 | 10 | 7 |

FIGS. 6 and 7 respectively show micrographs of the texture regions of Examples 1 and 4. FIG. 8 shows a micrograph of the texture region of Comparative Example 1.

As shown in FIG. 6, it was confirmed that projection regions formed by aggregation of particles were closely formed in the texture region, and a gap region was present between the projection regions in Example 1. Since the texture region having such a fine shape was formed, so that the decorative material of Example 1 having an excellent tactile is obtained.

As shown in FIG. 7, it was confirmed that projection regions formed by aggregation of particles were closely formed in the texture region also in Example 4. Further, a surface coating layer was formed on the heaping layer in Example 4, where a good tactile was obtained. This was because a base coating layer having a sufficient hardness was formed by heating after formation of the base coating layer, and thus projection regions having sufficient heights could be closely formed.

Comparing Example 1 and Example 2, it can be understood that projection regions having sufficient heights can be formed by heating the base coating layer at a higher temperature, so that an excellent tactile is obtained.

Meanwhile, as shown in FIG. 8, aggregation of particles could be hardly seen, and particles were sparsely dispersed in Comparative Example 1. The average height was also lower than in Examples. It is considered from this fact that since the hardness of the base coating layer was insufficient, and the lower layers of the projection regions were recessed due to the particles, projection regions having sufficient heights could not be formed.

[Decorative Material]

Another decorative material (which will be hereinafter referred to as "decorative material 100") included in the present embodiment comprises a metal base material made of metal having a first surface and a second surface; a pattern layer having a first surface and a second surface and comprising a resin binder and colorants, the second surface side of the pattern layer being disposed facing the first surface side of the metal base material; and a particle group comprising particles with a particle size of 5 μm or more and 60 μm or less and disposed on the first surface side of the pattern layer, wherein the surface of the decorative material comprises a texture region having a texture and a tactile different from those of the second surface of the metal base material, the texture region has irregularities, the irregularities comprise a first projection region, a second projection region present at a position away from the first projection region, and a gap region present between the first projection region and the second projection region, and the first projection region and the second projection region project on the front side of the decorative material due to the presence of the particle group.

FIG. 9 shows a schematic cross-sectional view of a part where the texture region is provided in a decorative material A according to one specific example of the present embodiment. As shown in FIG. 9, the decorative material A (1) comprises "a metal base material (2) made of metal having a first surface (2a) and a second surface (2b)", "a pattern layer (5) having a first surface (5a) and a second surface (5b) and comprising a resin binder and colorants, in which the second surface (5b) side of the pattern layer is disposed facing the first surface (2a) side of the metal base material", and "a particle group comprising particles (21) with a particle size of 5 μm or more and 60 μm or less and disposed on the first surface (5a) side of the pattern layer" in this order.

Further, the surface of the decorative material A (1) comprises a texture region where the texture and the tactile are different from those of the second surface (2b) of the metal base material, the texture region has irregularities (7), the irregularities (7) include a first projection region (20a), a second projection region (20b) present at a position away from the first projection region, and a gap region present between the first projection region and the second projection region. Further, in the decorative material A (1), the first projection region (20a) and the second projection region (20b) project on the front side of the decorative material due to the presence of the particle group.

As shown in FIG. 9, the decorative material A may have a configuration other than the configuration comprising the metal base material made of metal, the pattern layer, and the particle group. For example, the decorative material A may have the primer layer 3 and the base coating layer 4 between the metal base material made of metal and the pattern layer. Further, the decorative material A may have the protective layer 6 between the pattern layer and the particle group. Further, the decorative material A may have the surface coating layer 8 on the opposite side of the pattern layer of the particle group.

The decorative material A shown in FIG. 9 has two sets of a first projection region (20a) and a second projection region (20b). As shown in FIG. 9, the decorative material A preferably has a plurality sets of the first projection region (20a) and the second projection region (20b). The first projection region (20a) and the second projection region (20b) preferably contain a plurality of particles with a particle size of 5 μm or more and 60 μm or less.

The decorative material A may have second irregularities having a smaller width or lower height than those of the first irregularities on the surfaces of the first projection region (20a) and the second projection region (20b). The second irregularities can be formed, for example, by individual particles contained in the first projection region (20a) and the second projection region. In the case of FIG. 9, the surface coating layer 8 is present on the surface of the particles 21, but the surface coating layer is thin, and thus small irregularities roughly following the surface shape of the particles are formed on the surfaces of the first projection region (20a) and the second projection region (20b). Specific embodiments of each region, each layer, and each material constituting the decorative material A are described in the same manner as in the description for the decorative material 1 of the present embodiment mentioned above.

REFERENCE SIGNS LIST 1, 100: Decorative material
2: Base material
3: Primer layer
4: Base coating layer
5: Pattern layer
6: Protective layer
7: Heaping layer
8: Surface coating layer
10: Texture region
11: Other region
20: Projection regions
21: Particles
22: Binder resin
30: Gap region

The invention claimed is:

1. A decorative material comprising:
a texture region on a base material, the texture region being composed of:
a plurality of projection regions that comprise a plurality of particles with a particle size of 5 μm or more and 60 μm or less and are independent of each other; and a gap region between the projection regions,
wherein:
an average diameter of circumscribed circles of the projection regions, when the texture region is viewed in plan view, is 100 μm or more and 500 μm or less; and
the particles with a particle size of 5 μm or more and 60 μm or less are organic fillers.

2. The decorative material according to claim 1, wherein an area percentage of the projection regions in a range of 1 cm square of the texture region is 20% or more and 70% or less.

3. The decorative material according to claim 1, wherein when the average diameter of the circumscribed circles of a set of adjacent projection regions is referred to as $d_{ave}$, and a distance between centers of the set of adjacent circumscribed circles is referred to as D, 90% or more of all combinations satisfy $0.5 \leq D/d_{ave} \leq 6.0$.

4. The decorative material according to claim 1, wherein the shortest distance between adjacent projection regions is 50 μm or more and 120 μm or less.

5. The decorative material according to claim 1, wherein an average height of the projection regions is 10 μm or more and 60 μm or less.

6. The decorative material according to claim 1, comprising a heaping layer at least partially on the base material, wherein the texture region is on a surface of the decorative material on a side having the heaping layer.

7. The decorative material according to claim 1, wherein an area percentage of the texture region in a surface of the decorative material is 10% or more and 90% or less.

8. The decorative material according to claim 1, wherein the base material is a metal base material.

9. The decorative material according to claim 8, wherein the metal base material comprises one or more selected from the group consisting of aluminum, iron, and copper.

10. The decorative material according to claim 1, comprising a surface coating layer on the outermost surface of the decorative material on a side having the texture region.

11. The decorative material according to claim 1, wherein the projection regions further comprise bright particles.

12. The decorative material according to claim 1, further comprising a region other than the texture region on the base material,
wherein when 60-degree specular gloss of the texture region is defined as G60A, and the 60-degree specular gloss of the region other than the texture region is defined as G60B, a ratio G60A/G60B is 0.8 or less.

13. The decorative material according to claim 1, wherein the average diameter of the circumscribed circles of the projection regions is 230 μm or more and 500 μm or less.

14. A decorative material comprising:
a metal base material made of metal having a first surface and a second surface;
a pattern layer having a first surface and a second surface and comprising a resin binder and colorants, a second surface side of the pattern layer being disposed facing a first surface side of the metal base material; and
a particle group comprising particles with a particle size of 5 μm or more and 60 μm or less and disposed on the first surface side of the pattern layer,
wherein:
the surface of the decorative material comprises a texture region having a texture and a tactile different from those of the second surface of the metal base material;
the texture region has irregularities comprising:
a first projection region,
a second projection region present at a position away from the first projection region, and
a gap region present between the first projection region and the second projection region, and
the first projection region and the second projection region project on a front side of the decorative material due to a presence of the particle group, and
the particles with a particle size of 5 μm or more and 60 μm or less are organic fillers.

15. The decorative material according to claim 14, wherein an area percentage of the texture region in the surface of the decorative material is 10% or more and 90% or less.

16. The decorative material according to claim 14, wherein the metal base material comprises one or more selected from the group consisting of aluminum, iron, and copper.

17. The decorative material according to claim 14, further comprising a region other than the texture region on the base material, wherein when 60-degree specular gloss of the texture region is defined as G60A, and the 60-degree specular gloss of the region other than the texture region is defined as G60B, a ratio G60A/G60B is 0.8 or less.

18. A laminate comprising:
an adherend; and
the decorative material according to claim 1 that is laminated on the adherend.

\* \* \* \* \*